United States Patent Office 2,767,117
Patented Oct. 16, 1956

2,767,117

POULTRY VIRUS VACCINE PRODUCTS AND METHOD OF PREPARING THE SAME

John Frederick Crawley, Weston, Ontario, Canada, assignor to The Governors of the University of Toronto, Toronto, Ontario, Canada No Drawing. Application October 22, 1953, Serial No. 387,780

10 Claims. (Cl. 167—78)

The present invention relates to novel poultry virus vaccine products and to methods for preparing these products. More particularly, the invention relates to potent and stable forms of the vaccines of poultry virus diseases and especially of the common respiratory virus diseases of poultry; Newcastle disease and infectious bronchitis. The invention also relates to novel processes in the preparation of vaccines of the common respiratory diseases of poultry.

Newcastle disease is a virus disease which infects poultry, and chickens in particular. It is otherwise known as avian pneumoencephalitis. This disease has reached tremendous economic importance to the chicken raiser because of its widespread incidence and its destruction of his flocks. Others have proposed vaccines for immunizing flocks against the ravages of this disease. While some of these vaccines have been moderately successful in producing immunization, they possess certain shortcomings which have made practical immunization either too costly due to the necessity of capturing the individual birds to immunize them, or a low percentage of birds are immunized, or the immunization is only of transient duration and thus re-vaccination is often required after a short period of time.

Infectious bronchitis, while it is at present not as highly feared as Newcastle disease, is becoming more and more a problem to poultry raisers. Its high rate of incidence is now recognized as a result of more accurate means of diagnosis. Heretofore many of the ills of poultry have been incorrectly attributed to other diseases. As methods of diagnosis have improved, it has become increasingly apparent that infectious bronchitis is the offender in many cases.

To immunize poultry against common respiratory diseases, such as the above two diseases, it is highly desirable to immunize the flocks by spraying the vaccine into the air in an enclosure or area into which the birds have been collected. Until recently the only generally accepted practice has been to vaccinate the birds by the so-called "wing-web" technique or by instilling vaccine into the eyes or nose of the bird. These methods have now fallen into relative disuse for they require the capture and handling of the individual bird. This is very costly and time-consuming, particularly when large flocks must be vaccinated, and it is difficult to be sure that each bird has been vaccinated when thousands of them must be treated by hand.

To overcome the shortcomings of these prior methods of vaccination, the spray technique of vaccination was developed. For effective immunization against the virus disease by the spray technique, the vaccine used must meet a number of rather rigid requirements which the vaccines of the prior art have met only partially if at all. First of all, the vaccine should be of a rather high potency. Thus material to immunize 1,000 birds should contain about $10^5$ chick embryo lethal doses in the case of infectious bronchitis vaccine and $10^{10}$ chick embryo lethal doses in the case of Newcastle disease vaccine. The vaccine must be capable of being reduced to a form which will be stable during long periods of storage and yet permit simple reconstitution or other treatment at the time of vaccination to provide a live, although attenuated virus vaccine. Until the present invention, these objectives have not been attained.

In an endeavor to achieve desired results, it has been a reasonably common procedure to freeze vaccine. While some degree of stability may be obtained by freezing the virus vaccine, this is not a convenient mode of storage for long periods of time, nor is it convenient to ship the vaccine in the frozen state. Many poultry raisers do not have facilities to store the vaccine in the frozen state and in the event of failure of the refrigeration facilities during storage or shipment, the virus will spoil or lose its activity. Chemical treatment and desiccation have been tried but as pointed out by F. R. Beaudette in his publication in the Journal of The American Veterinary Medical Association, volume 65, No. 872, pages 367–77 (1949), at page 371, attempts to use chemical agents to stabilize Newcastle disease virus have met with little success. Some preparations of desiccated virus have either failed to immunize the birds or caused death. Other methods of producing a product suitable for reasonable periods of storage have left something to be desired in the potency of the vaccine product.

Other shortcomings of some of the products of the prior art are that they cannot safely be used to vaccinate birds until they have reached a certain age (such as 4 weeks of age) or that the vaccine will not produce immunization of the birds until after they have reached a certain state of growth. This causes a great inconvenience to the poultry raiser since his flock may become infected with the virus before the birds can be vaccinated. It is a great advantage to be able to vaccinate the flock within the first few days of life for the birds are all together and are of small size. With the stable vaccine produced by the present invention it is permissible to vaccinate as early as the first few days of the life of the bird. Effective immunization at this early stage with the spray technique was not possible until the stable high-potency vaccines of the present invention were made available. The products of the present invention will effectively immunize birds at 1 to 3 days of age, though in the case of infectious bronchitis the chicks should possess some degree of parental immunity. The products of the present invention produce an immunity which lasts during most of the life of broilers and thus it is not necessary to revaccinate as it is with some prior art products. The products of the invention may, however, be used for revaccination without untoward results where additional assurance of immunity is desired in birds vaccinated earlier with the products of the invention or where revaccination is necessary in birds vaccinated with the less potent vaccines of the prior art or where birds are being retained for a lengthy period for egg production.

Another danger often present in vaccines is that the vaccine itself may be so virulent as to produce an infection in the flock. This deficiency can have serious consequences. The results obtained with the products of the present invention show that they are free from this defect.

By using a vaccine of the common respiratory virus poultry diseases produced in accordance with the present invention, it is possible to vaccinate poultry successfully by the spray technique without encountering the difficulties described above which are inherent to the products of the prior art.

It is an object of the present invention to provide novel stable, high-potency vaccines of the common respiratory virus diseases of poultry which may be stored for long periods of time and which may be used to immunize poultry without encountering the adverse results obtained by the prior art vaccine products.

It is another object of the present invention to provide a novel process for producing stable, high-potency vaccines of the common respiratory virus diseases of poultry, including Newcastle disease and infectious bronchitis.

It is a further object of the present invention to provide a novel method for enhancing the yields of vaccines produced from the respiratory virus diseases of poultry.

Other objects of the invention will be apparent to those skilled in the poultry immunization art from reading the specification which follows.

An important phase of my invention comprises the preparation of a dry, stable, easily reconstituted form of vaccines of the common respiratory virus diseases of poultry and of Newcastle disease and infectious bronchitis in particular. This product is a dried product produced from a mixture of the freshly produced vaccine and a sterile, non-homologous serum or plasma, or from a sterile homologous serum or plasma collected from birds of the same species and of disease-free flocks. The sera and plasma of non-homologous animals may be from a wide variety of sources including that which is readily available in large quantities, such as obtained from horses, cows and other mammals. Excellent results, for example, have been obtained using horse serum. When serum or plasma is used which is obtained from the blood of poultry, it is important to test the flock which is the source of the blood to be sure that the flock is free from respiratory diseases. I prefer to use the blood of non-homologous animals as the source of the serum or plasma as such blood is usually available in much greater quantities at lower costs and particularly because the animals from which such blood is derived are not usually susceptible to infection with poultry respiratory virus and thus need not be tested to determine freedom from virus infection.

When plasma is used it is necessary to first defibrinate the plasma to prevent clotting. Because of this added inconvenience, I prefer to use serum directly in producing my stable product although as is well known serum differs from plasma mainly in that serum has had the fibrin removed. Thus for the purpose of my invention plasma is an equivalent of serum and I shall hereinafter refer to both only as "serum."

In practicing this phase of my invention, I add to the freshly prepared vaccine a suitable amount of blood serum. I have found that an amount of from about ¼ to about ¾ by volume of serum per total volume of mixture gives excellent results. I prefer to use about 33% by volume of total mixture. After mixing the vaccine and serum, I then lyophilize the mixture by this well-known technique which comprises freezing and then removing the moisture by vacuum. When dry, the product of the invention is obtained which is stable for long periods of time in a refrigerator or for somewhat shorter periods at room temperature when stored in tightly sealed containers. This dry, stable product is easily reconstituted with water, but preferably with a more suitable solvent which will hereinafter be described. There is then obtained a high potency, reconstituted vaccine which is stable for short periods of time until it can be used. This dry, stable vaccine and its reconstituted form will be described in more detail in connection with the discussion of my process of preparing the product which will follow.

In connection with the description of my process of preparing a stable vaccine of poultry respiratory disease virus which follows I wish to point out that for best results it is desirable to combine a number of the steps, treatments and techniques which are set forth. It is essential to the success of the process and product to combine some of these and highly advantageous to employ all.

Generally speaking, my process comprises inoculating a quantity of a strain of the poultry respiratory disease virus into a live chicken embryo. I prefer to treat the virus with suitable antibiotics, such as penicillin and streptomycin or other antiseptics to insure that the preparation is free, or reasonably free, from bacteria. I prefer to put this so-called "seed" or virus into a live chicken embryo which has been incubated at 37.5° C. for approximately 9 days. This inoculation should not entail the use of more than 1,000 lethal doses. A "lethal dose" is defined as that amount of virus which will kill 50 percent of 9-day old chick embryos ($LD_{50}$). The inoculating "seed" is prepared by mixing dried virus powder with a fluid containing 5 cc. of horse serum per 100 cc. of 0.85% sodium chloride solution. It is important here that fertile eggs are used, obtained from flocks of chickens free from respiratory diseases, as well as other diseases. Although I usually use chickens, other eggs such as turkey eggs or duck eggs may be used subject to restrictions of supply, and freedom from disease.

In inoculating the chicken embryo with seed I have found that it is important for optimum results to inoculate the chorio-allantoic sac or amniotic sac of the fertile egg. In fact, the inoculation of the chorio-allantoic or amniotic sacs of the embryo and harvesting the vaccine from these sacs comprises an important part of my invention. By using this technique I obtain a number of advantages over the practices of the prior art. By inoculating the chorio-allantoic or amniotic sacs I find that it is possible to obtain optimum development of virus. By harvesting from the chorio-allantoic and amniotic sacs, a more concentrated preparation of the vaccine is obtained since smaller amounts of fluid are harvested than with prior art methods, without significant loss of the active components of the vaccine. Also by selective harvesting from these sacs and using eggs of the age described less extraneous and undesirable material is obtained than is the case in the prior art.

Before inoculating the chorio-allantoic sac of the chicken embryo, the eggs containing the embryo are placed on end, air sac up, and preferably rotated at intervals during the first 5 days of incubation at a temperature of about 37.5° C. I prefer to inoculate 9-day old eggs but eggs up to 11 days old may be used.

The chick embryo is then inoculated. Although I prefer to make this inoculation by way of the chorio-allantoic sac, I may use some other route such as the amniotic sac, yolk sac or inoculation directly into the embryo. The eggs are then incubated for from about 1 to about 6 days, and preferably about 48 hours, in a commercial incubator. A temperature of 32.5° to 39° C. is desirable, although best results are obtained at a temperature of about 35° to 37.5° C. and optimum results at about 37° C. In the case of some viruses, such as Newcastle disease, I find that it is important to then chill the egg to a temperature of less than 10° C. but above freezing temperature for a period of about 16 hours. A temperature of 4° C. provides excellent results. This chilling technique is used to prevent hemorrhaging of the red blood cells of the embryo which would absorb the virus. In the case of other poultry respiratory virus diseases, such as infectious bronchitis, I find that this chilling step is not necessary.

Harvesting the virus-laden fluids from the chick embryo is the next step. As indicated above, I prefer to accomplish this by withdrawing the contents of the chorio-allantoic and amniotic sacs. This is usually done by removal with a hypodermic syringe. It is good technique to be sure that the embryo is still alive at the time of harvesting. On an average about 10 cc. of fluid is obtained from each egg. This means of harvesting virus is superior to methods which entail grinding most or all of the egg contents to obtain the active virus.

The sterile pool of vaccine harvest obtained by combining the harvest of a number of eggs is next prepared for storage. Prior to storage, I remove a small sample of the pool to conduct a sterility test. (If the results of this test prove unsatisfactory I do not finish the processing of the pool. However, I do not delay the processing simply to await the results of the test.) This preparation for storage is accomplished by adding a suitable volume of serum to the harvest. One convenient concentration of serum has been to add sufficient serum, such as horse serum, to make up about 33% by volume of the mixed serum and vaccine. As a precaution I optionally add mixtures of antibiotics to insure continued sterility of the mixture during processing. For example, by adding 2,000 units of penicillin and 2,000 micrograms of streptomycin per cc. of fluid vaccine containing the serum, satisfactory precautions will usually have been observed. It is also desirable to add about 2,000 micrograms of terramycin per cc. of serum-treated fluid vaccine with the object of destroying any chronic respiratory disease agent which may be present in the virus preparation in spite of the precautions which have been taken.

The serum-treated fluid vaccine is now ready for drying. I prefer to accomplish this by filling it into bottles, having a capacity about 150 to 400 cc. The contents of the bottles are then subjected to lyophilization or freeze-drying in accordance with the usual methods. This is accomplished by freezing the fluid vaccine containing the serum and then removing moisture from the frozen product by high vacuum. The vaccine is maintained in a frozen condition during substantially all of the drying procedure. When the product is substantially moisture free, it may optionally be subjected to further drying by spreading the dry powder and subjecting it to the drying action of a strong desiccating agent, such as phosphorus pentoxide. When the product has been thoroughly dried it is then packaged into ampules of suitable dosage as a dry powder. One suitable dosage is in a 1,000-dose container standardized to about $10^{10}$ lethal doses of active vaccine in the case of Newcastle disease vaccine or $10^5$ lethal doses in the case of infectious bronchitis vaccine. The space in the ampule above the powder is filled with dry air, or the ampule evacuated and sealed, or preferably filled with an inert atmosphere of dry nitrogen.

At the time of vaccination of a poultry flock, which may advantageously be when the flock is from 1 to 3 days old and still all together, the dry, stable vaccine product is mixed with a desirable volume of a suitable liquid, such as an aqueous buffered solution having a pH of 6.5 to 7.5, or preferably 6.8 to 7.2 and optimally 7.0. A suitable buffering agent is an $$\frac{M}{150}$$

solution of disodium acid phosphate. I find that it is desirable for the buffered aqueous solution to contain 10% by weight of glycerine or other non-toxic polyhydroxy compound and 0.85% sodium chloride. About 200 cc. of this buffered solution will properly dilute a 1,000-dose amount of my dry, stable vaccine product, although a volume of as little as 100 cc. may be used. Other liquids may also be used as diluents.

The flock of poultry is vaccinated by spraying the air of the space into which the poultry are confined with the reconstituted vaccine preparation of the invention. Preferably means are taken to prevent ventilation of the space which would dissipate the supply of vaccine until all of the birds have been vaccinated.

Another feature of my invention comprises a dry, stable, high-potency product containing both Newcastle disease and infectious bronchitis vaccines stabilized with serum. This product is prepared by mixing quantities of each of the dry vaccines to provide desirable ratios and dosages, conveniently just prior to vaccination.

In order to disclose more clearly the nature of the present invention, specific examples illustrating the invention will hereinafter be described. This is done solely by way of example and is intended neither to delineate the scope of the invention nor limit the ambit of the appended claims.

EXAMPLE A

*Infectious bronchitis vaccine*

720 White Leghorn eggs were placed at 37.5° C. for incubation for a period of 9 days. 614 of these eggs were fertile and were inoculated with infectious bronchitis seed. This inoculation comprised the injection of 0.2 cc. of a preparation of seed into the chorio-allantoic sac. This 0.2 cc. of inoculum corresponded to approximately 100 embryo lethal doses. The virus was suspended in a diluent consisting of 0.85% sodium chloride with 5% normal horse serum and 5,000 units of penicillin and 5,000 micrograms of streptomycin per cc.

Two days after inoculation the chorio-allantoic fluid from the living embryos (599) was harvested and pooled. Sterility tests of the harvest were conducted. The harvest amounted to 4,800 cc. and to this I added 2,400 cc. of normal horse serum and 1 gram of each of penicillin, streptomycin and terramycin. The harvest was divided into approximately 150 cc. quantities, frozen, and placed in vacuum cabinets for drying from the frozen state. About 2 days later the bottles containing the dried vaccine were stoppered and placed in a refrigerator.

Subsequently the vaccine was ground in a ball mill and placed in large evaporating dishes. The weight of the dried material was 287 grams. After a short period of storage in vacuo over phosphorus pentoxide the product was sealed in ampules. Into each ampule I placed that quantity of dried ground powder which occupied a volume of about 1 cc. By this time the sterility tests to which reference was made above had been completed and I was satisfied to continue with the preparation and to use the product.

I removed one of the above-mentioned ampules of dried vaccine. The powder was reconstituted in 200 cc. of saline (0.85% sodium chloride solution) and for the purpose of calculation this dilution was called $10^{-1}$. The $LD_{50}$ as calculated for 9-day old embryos inoculated by the allantoic sac was $10^{-3.4}$ per 0.1 cc. of the reconstituted vaccine. Thus each ampule contained approximately $10^{+5.4}\times 2$ embryo lethal doses or $10^{+5.7}$ doses.

Having occasion to immunize some chicks I used a sample of the above-mentioned vaccine. 628 chicks, ten days old, were vaccinated by spraying over their heads in a closed area, 125 cc. of the reconstituted vaccine. The total mortality during the 3-week period immediately following vaccination was only nine chicks, which represents a mortality of only 1.3%.

EXAMPLE B

*Newcastle disease live virus vaccine*

720 White Leghorn eggs were placed in an incubator at 37.5° C. Nine days later 581 of these contained living embryos and were inoculated with Newcastle disease vaccine seed. The amount of inoculum injected into each egg by way of the chorio-allantoic sac was 0.2 cc. This quantity contained about 1,000 embryo lethal doses. The seed had been prepared for use in a diluent consisting of 0.85% sodium chloride solution to which normal horse serum had been added to produce a concentration of 5%. The diluent also contained 5,000 units of each of penicillin and streptomycin per cc. of saline and 333 milligrams of terramycin per 100 cc. of the diluent.

Two days after inoculation 527 embryos were living and these eggs were placed in the refrigerator overnight preparatory to harvest. The following morning I collected a total of 4,500 cc. of allanto-amniotic fluid. This represented a yield of about 8.5 cc. per egg. The harvest was collected in pools and a sample was removed from each pool for the purpose of a sterility test.

To the volume of approximately 4,500 cc. of virus fluid I added 2,250 cc. of normal horse serum and one gram of each of penicillin, streptomycin and terramycin, The fluid vaccine was then divided into quantities of approximately 150 cc., frozen, and placed in vacuo for drying from the frozen state. By the time the drying was completed the sterility tests had also been finished. In the light of the results of those tests I continued with the preparation of the dried vaccine. At the conclusion of the drying period the bottles were stoppered and placed in a refrigerator. As soon as was convenient, i. e., two or three days later, I placed the dried vaccine in a ball mill. The weight of the dried, ground vaccine amounted to 244 grams. This was placed in vacuo over phosphorus pentoxide and stored in a refrigerator until I could continue with the tests.

After storage for about 10 days in the refrigerator I removed a quantity of dried ground vaccine having a volume of about 1 cc. (This is the same volume as I use when I seal the vaccine in ampules for distribution for use in immunizing chickens.) This powder was suspended in 100 cc. of saline which had been buffered and which contained 10% by weight of glycerine. This dilution was designated $10^{-1}$. The $LD_{50}$ was $10^{-8.4}$. I determined this by inoculating 9-day old embryos into the chorio-allantoic sac with 0.1 cc. of serial 10-fold dilutions of the above suspension. Since the $LD_{50}$ was $10^{-8.4}$ each ampule contained $10^{+10.4}$ embryo lethal doses of vaccine virus.

In one use of this vaccine I sprayed a saline suspension as described above over the heads of 700 chicks of 7 days of age. During the 3-week period which followed this vaccination there were no deaths from any causes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A dry, stable vaccine product of a poultry respiratory virus disease selected from the class consisting of Newcastle disease and infectious bronchitis produced by lyophilizing together a vaccine of the attenuated live virus of the disease and mammalian blood serum.

2. The dry, stable vaccine product as defined by claim 1, wherein the mammalian blood serum is present in sufficient amount to comprise from about one-fourth to about three-fourths by volume of the total volume of the mixture prior to lyophilizing.

3. The dry, stable vaccine product as defined by claim 1, wherein the mammalian blood serum comprises about one-third by volume of the total volume of the mixture prior to lyophilizing.

4. The dry, stable vaccine product as defined by claim 1, wherein the serum is horse serum.

5. The dry, stable vaccine product as defined by claim 1, wherein the serum is horse serum.

6. A dry, stable high-potency vaccine product as defined by claim 1, wherein the attenuated live virus is infectious bronchitis virus and the product has a potency of at least $10^5$ lethal doses per 1,000 doses of vaccine.

7. A dry, stable high-potency vaccine product as defined by claim 6, wherein the attenuated live virus is Newcastle disease virus and the product has a potency of about $10^{10}$ lethal doses per 1,000 doses of vaccine.

8. A process for preparing a stable, high-potency poultry respiratory virus disease vaccine product of an attenuated live virus selected from the class consisting of Newcastle disease and infectious bronchitis viruses which comprises inoculating a member selected from the class consisting of the chorio-allantoic and amniotic sacs of a live chicken embryo with the live virus, incubating the inoculated embryo at a temperature of from about 32.5° to 39° C. for from 24 to 96 hours, harvesting the fluid from the chorio-allantoic and amniotic sacs, adding blood serum to the embryo fluid and lyophilizing the mixture to a substantially anhydrous condition.

9. A process for preparing a stable, high-potency poultry respiratory virus disease vaccine product as defined in claim 8, wherein the live virus is Newcastle disease and the inoculated embryo is subjected to chilling after incubation and prior to harvesting.

10. The process of preparing a stable, high-potency poultry respiratory virus disease vaccine product of an attenuated live virus selected from the class consisting of Newcastle disease and infectious bronchitis viruses as defined in claim 8, wherein the serum used is horse serum.

References Cited in the file of this patent

UNITED STATES PATENTS 778,667 Houghton ______________ Dec. 27, 1904

OTHER REFERENCES

Brandly et al.: Am. J. Vet. Res., July 1946, pp. 294, 295, 299–301.

J. Am. Veter. Med. Assn., November 1949, pp. 371–373.

Hansen et al.: J. Pharm. & Pharmacol., vol. 3, No. 8, August 1951, pp. 519 and 520.

[1] Speck et al.: pp. 253–258, vol. 61, J. Bact., March 1951.

[1] Allen et al.: pp. 369–376, vol. 63, J. Bact., March 1952.

Beveridge et al.: "The Cultivation of Viruses and Rickettsiae in the Chick Embryo," pp. 57–58, published by His Majesty's Stationery Office, London, England.

Dick et al.: J. of Immunology, vol. 62, 1949, pp. 311–317.

Dubos: "Bacterial Cell," pg. 230, published 1955 by Harvard University Press, Cambridge, Mass.

Clifton Annual Review of Microbiology, vol. 6, 1952, pg. 132.

[1] Copies in Patent Office Sci. Libr.